Oct. 22, 1940.  T. W. KENYON  2,219,267
DEVIOMETER
Filed July 31, 1937  3 Sheets-Sheet 1
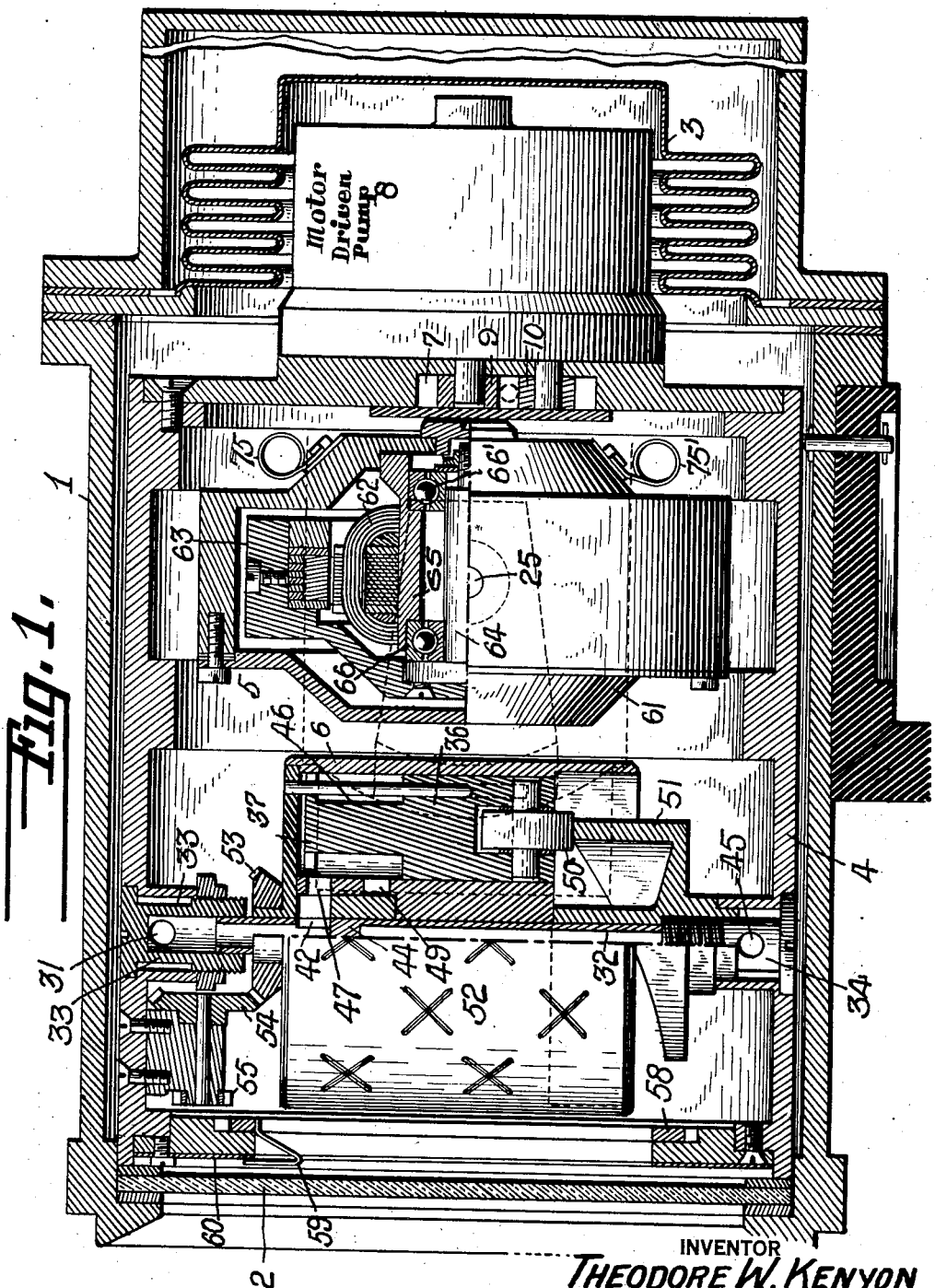
INVENTOR
THEODORE W. KENYON
BY
Herbert H. Thompson
HIS ATTORNEY Oct. 22, 1940.  T. W. KENYON  2,219,267
DEVIOMETER
Filed July 31, 1937   3 Sheets-Sheet 2
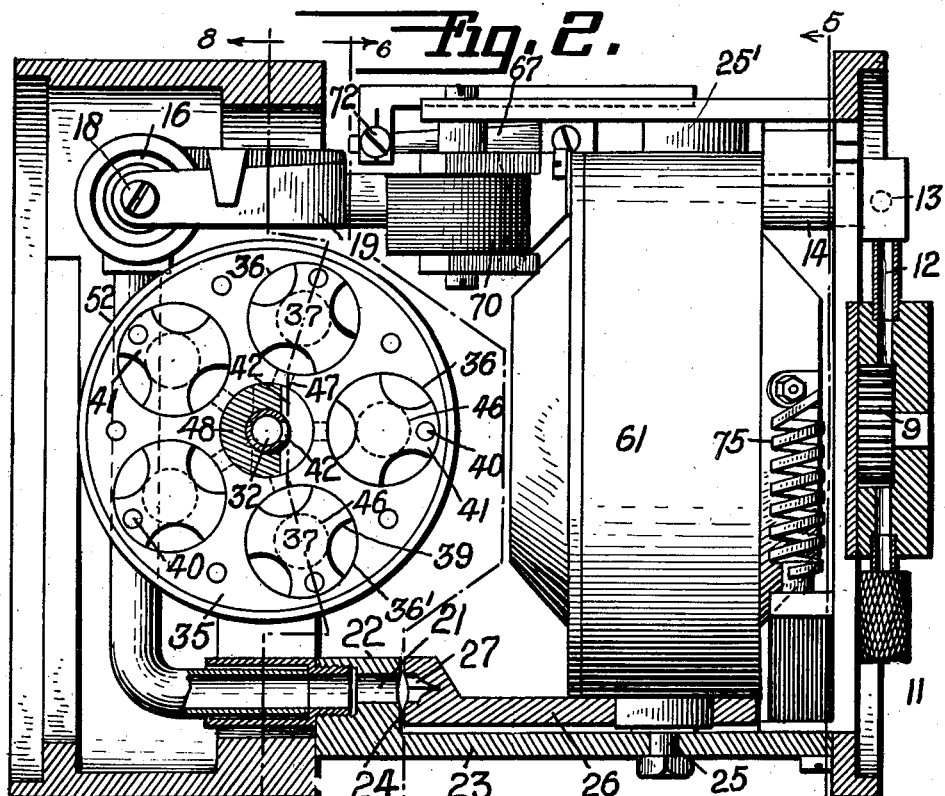
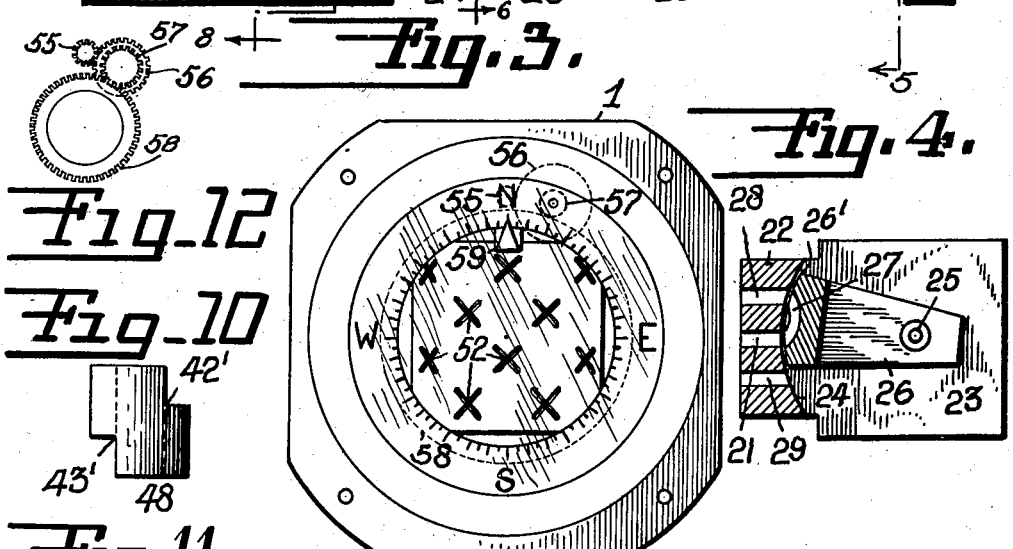
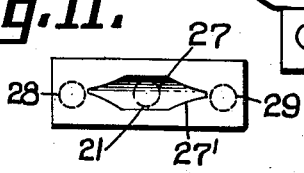
INVENTOR
THEODORE W. KENYON
BY
Herbert H. Thompson
HIS ATTORNEY Oct. 22, 1940. T. W. KENYON 2,219,267
DEVIOMETER
Filed July 31, 1937 3 Sheets-Sheet 3
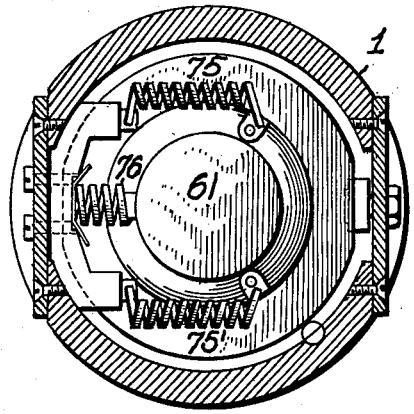
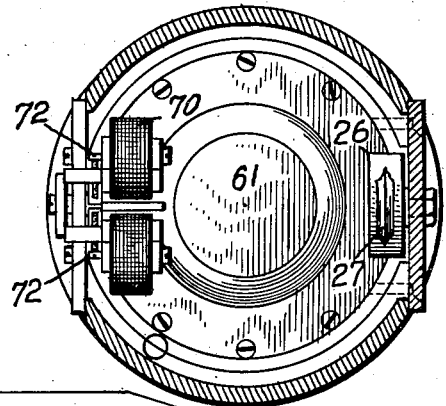
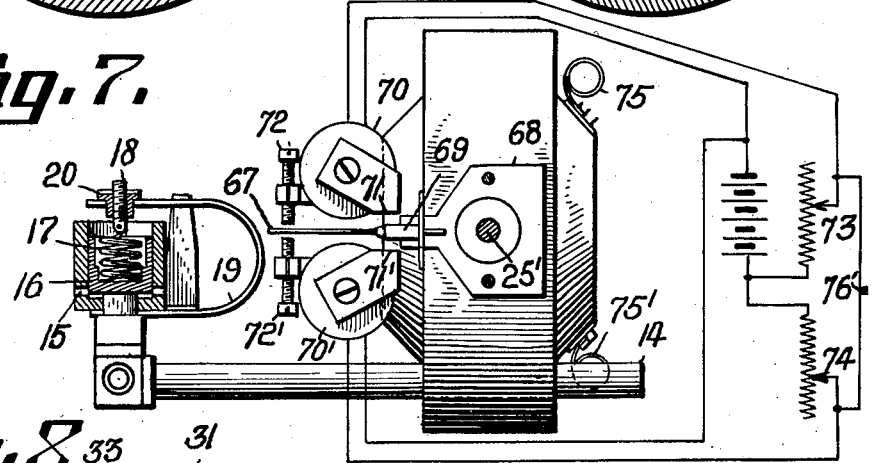
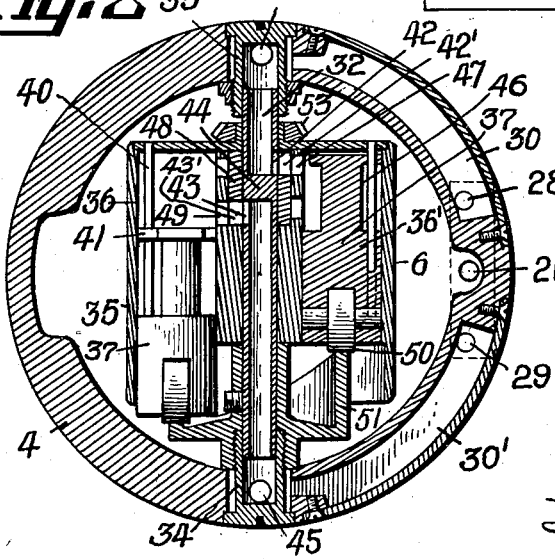
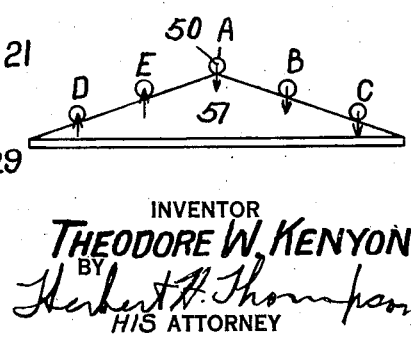
INVENTOR
THEODORE W. KENYON
BY
Herbert H. Thompson
HIS ATTORNEY Patented Oct. 22, 1940

2,219,267

UNITED STATES PATENT OFFICE 2,219,267

DEVIOMETER

Theodore W. Kenyon, Huntington, N. Y., assignor to Sperry Gyroscope Company, Inc., Brooklyn, N. Y., a corporation of New York Application July 31, 1937, Serial No. 156,657

10 Claims. (Cl. 33—204)

This invention relates to course indicators or course deviation indicators for aircraft. More particularly, it relates to the type of deviometer shown in my prior application Serial No. 68,392, filed March 12, 1936, for Deviometers, the present invention constituting a simplification and improvement in the mechanism shown in my prior application. Many features of my invention have broader application, however, including my improved hydraulically operated rotary indicator and my improved oil pick-off or valve means operated from the gyroscope.

By my invention I am also enabled to change course at a predetermined rate and also to correct the neutral or stand-still position of the gyroscope easily from outside of the sealed casing, preferably by electrical means.

Referring to the drawings, showing the preferred form of my invention.

Fig. 1 is a vertical section of my device on an enlarged scale.

Fig. 2 is a horizontal section of a portion of the inside casing, the outer cover having been removed and parts omitted.

Fig. 3 is a face view of the instrument, on a smaller scale, as mounted on the instrument panel of an aircraft.

Fig. 4 is a detail sectional view of the pick-off valve from the gyroscope which controls the hydraulic engines.

Fig. 5 is a vertical section through the inner casing, taken approximately on line 5—5 of Fig. 2, showing the gyroscope in rear elevation and showing approximately the actual size of the parts.

Fig. 6 is a vertical section approximately on line 6—6 of Fig. 2, through the interior casing, showing the gyroscope in front elevation.

Fig. 7 is a side elevation, partly in section, of the gyroscope and temperature controlled pressure regulator.

Fig. 8 is a vertical section through the inner casing, taken approximately perpendicular to Fig. 2 through the center of the engine approximately on broken line 8—8 of Fig. 2.

Fig. 9 is a developed diagram of the cam against which the pistons push.

Fig. 10 is a detail view of a collar within the engine.

Fig. 11 is a face view of the portion of the pick-off valve attached to the gyroscope.

Fig. 12 is a detail of the gearing shown in dotted lines in Fig. 3.

The entire instrument is shown as enclosed in an outer casing 1 having a front window 2, through which the several indications are visible. Said outer casing may be entirely filled with oil or other fluid, the false rear wall thereof being provided with an expansible closure 3 to allow for expansion and contraction of the liquid. Within said outer casing is mounted an inner framework 4 which supports the principal elements of the device, which comprise essentially a gyroscope 5 of the two degree of freedom or turn indicator type, a hydraulic engine 6 driven therefrom in a direction and at a rate proportional to the direction and extent of deviation of the gyroscope away from its neutral or centralized position, and an oil pump 7 driven from a motor 8 for supplying the actuating fluid. The pump is shown as of the gear type, comprising merely a pair of intermeshing pinions 9 and 10, the oil entering the pump through a cylindrical screen 11 (Fig. 2) and passing out from the pump through a pipe 12, elbow 13 and pipe 14 to the control valve (Fig. 7).

Preferably, I interpose in this pipe a means for compensating for variations in rate of oil flow due to temperature induced changes of viscosity. For this purpose I show by-pass or relief ports 15 located in an elbow of pipe 14, the opening of which is controlled by a piston 16. Piston 16 is normally held in position by a moderately stiff spring 17, the free end of which is connected to an adjustable set screw 18, the position of which is also automatically varied with temperature by means of a thermostatic bimetallic strip 19 on which the nut 20 which supports screw 18 is mounted. The bimetallic strip is so designed that upon decrease in temperature (which increases the viscosity of the oil), the upper end is moved downwardly in proportion so as to decrease the amount of oil by-passed and thereby increase the oil pressure and maintain the rate of flow substantially constant regardless of temperature changes.

The extension of pipe 14 communicates with a center port 21 in an upstanding end portion 22 of a plate 23 secured in frame 4. The inner face 24 of portion 22 is curved about the axis of precession 25, 25' of the gyroscope. To the trunnion or casing 61 of the gyroscope is fixed a valve member 26 having a recessed portion 27 at its outer surface, which is also curved about the precession axis 25, 25' and closely fits, without touching, the surface 24. Part 22 also has two outer discharge ports 28 and 29, one of which, 28, is connected by recess 27 to the intake port 21, when the gyro precesses upwardly as shown in Fig. 4, and the other of which, 29, is connected to said intake port when the gyro precesses downwardly from its normally horizontal position. In the central position, all ports are closed and any oil escaping from the middle port merely seeps out between the surfaces 24 and 26', maintaining the proper clearance at all times. Recess 27 is of a tapered cross section in both planes so as to have a throttling effect on the oil flow. It should be noted that the end walls 27' of the recess 27 are not only tapered but are convexly curved, as shown more clearly in Fig. 11. In other words, the side walls near their ends 27' preferably do not diverge at a uniform rate. This is for the purpose of compensating for the negative effect that the banking of the craft has on the rate of precession of the gyroscope. In other words, as the rate of turn increases the banking angle increases, and as the banking angle increases the extent of precession of the gyroscope drops off as a function of the angle of bank due to the fact that the precession axis 25 of the gyro becomes tilted as the plane banks until at 90° bank, turning would not cause precession of the gyroscope, since the turn would then be about an axis parallel to the trunnion axis 25. The slot 27 and end walls are curved so that the rate of flow of oil is approximately proportional to the rate of turn compensated for the normal angle of bank at that rate of turn.

Port 28 leads into a channel 30 in the framework 4 (Fig. 8), which carries the oil up to the top of the engine and in through port 31 and down into the hollow shaft 32 which is fixed in the end bushings 33 and 34 at top and bottom, while port 29 connects with shaft 32 through channel 30' and port 45.

The engine proper is multi-cylinder with an odd number of cylinders, and is formed in a block 35 rotatably mounted on hollow shaft 32 and having a plurality of vertical bores forming the engine cylinders 36, 36', etc. Within each cylinder is slidably mounted a piston 37, shown as having substantial length, with a reduced upper portion providing a cylindrical stem 46 having at the top a web 41 which has scalloped or cut out portions 39 therein. A guide rod 40 may also be provided for each piston so as to prevent turning thereof within the cylinder block. The hollow shaft 32 is shown as having a pair of axially spaced, substantially oppositely facing ports 42 and 43 therein, separated by closure 44 so that the upper portion is connected to port 28 on the controller through port 31 and the lower port 43 is connected through port 45 to port 29. A thrust collar 48 is secured to shaft 32, in which intake and exhaust ports 42' and 43' are provided. In the position of the right hand piston shown in Figs. 1 and 8, and with valve 26 in the position shown in Fig. 4, oil under pressure will enter the right hand cylinder through ports 42, 42' and port 47 in the cylinder wall, thus tending to force the piston downwardly. In the developed diagram of Fig. 9 the piston is at A at the top of cam 51. At the same time the ports 43 and 43' are in communication with the port 49 in the cylinder wall of cylinder 36' (D in Fig. 9), so that the oil in this cylinder will flow out through port 45, whence it will flow through port 29 back into the oil filled casing, which acts as a reservoir or sump for the system.

Each piston is shown as provided with a roller 58 rotatably mounted at the bottom thereof, which bears on a stationary cam surface 51 secured to bushing 34 and shaft 32 so that as each piston is forced downwardly, it will revolve the entire cylinder block and carry with it the cylindrical surface, the exterior of which may be provided with suitable markings 52 or a card to show the direction and general amount of movement of the block.

It will readily be evident that when valve 27 is in the central position, the engine will be locked in a standstill position, while when valve 26 is moved downwardly, the engine will be reversed because at that time the oil pressures (indicated by the arrows) in the cylinders A, B, C, D and E will be reversed. It should also be observed that when one port (28, for instance) is receiving pressure oil, the other is open to discharge it.

The engine may also drive a course indicating member or compass card. For this purpose, the cylinder block is shown as having mounted on the top thereof a bevel gear 53 which meshes with a bevel gear 54, on the shaft of which is mounted a pinion 55. Said pinion is shown as driving through reduction gears 56, 57 an annular gear 58 which may carry either one of a rotatable card or cooperating index. As shown, the gear carries a rotatable index 59 readable upon a fixed annular compass card 60. It will be evident that by careful calibration, the device may be designed so that the index will make one complete revolution during a complete turn of the craft, since the index is moved at a rate proportional to the rate of turn and integrates the movement with respect to time.

The gyroscope proper is shown as of the electrically spun type, being enclosed within a sealed casing 61 to keep the oil out of the stator 62 of the spinning motor which drives the rotor 63. The rotor is shown as mounted on one end of a shaft 64 which is journalled within sleeve 65, extending from the side of the casing 61, by means of anti-friction bearings 66, 66'. Current is shown as led into the gyroscope by three substantially torsionless leadin wires 75, 75' and 76, supplying polyphase current to the motor.

The gyro casing 61 is normally centralized with the rotor axis horizontal by means of a leaf spring 67 secured in a plate 68, fastened in some manner to the gyro casing adjacent the pivot 25'. Said spring is preferably secured in a soft iron part 69 which acts as an armature for electromagnets 70 and 70', having their poles 71 and 71' positioned on opposite sides of said armature. Adjustable stop members 72 and 72' are also provided, against which the leaf spring contacts when the gyro precesses in either direction, thus interposing a centralizing torque on the gyroscope proportional to the amount of precession away from the neutral or centralized position. The central position may be adjusted with respect to the valve mechanism by adjusting screws 72 and 72' before closing the casing and also, during operation, by varying the relative strength of the magnets 70 and 70', as by means of variable resistances 73 and 74 operated from outside of the casing 1 at any convenient point, such as knob or handle 76'.

By this arrangement a convenient means is provided for adjusting the gyroscope so that the valve 27 will occupy its central or standstill position when the craft is flying in a straight line, since if it does not do so the indicator card will slowly creep in one direction or the other, so that the aviator adjusts the knob 76' in such a direction as to cause the indicator to stand still. The knob 76' also furnishes a convenient means for resetting the compass card indicator 59 to synchronize it with the magnetic compass. All the aviator needs to do in case of loss of synchronism is to turn the knob 76', thus setting up a continuous turn of the cylindrical indicator 52 and slow revolution of the compass indicator 59. When the proper reading is reached, the knob 76' is turned backwardly to centralize the gyroscope and stop the movement of the two cards. It should be remembered that, in operation, all the mechanism shown in the figures is immersed in a bath of oil within the casing 1, so that it is impossible by ordinary means to reach within the casing and make direct adjustments.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. A course change indicator for moving craft, including a reversible multi-cylinder engine, rotatably mounted about a vertical axis and having a cylindrical exterior, indications on said exterior, means supplying pressure fluid to flow in either direction through said engine to drive the same in either direction and at a variable rate, and means responsive to the direction and rate of turn of the craft for governing said direction and rate of flow of said fluid, whereby the direction and rate of turn of said engine and indicator is governed.

2. A course change indicator as claimed in claim 1, having a rotatable annular compass card indicator surrounding said cylindrical indicator, and reduction gearing connecting said rotary engine and said indicator, to rotate the same through one complete rotation for one complete turn in azimuth of the craft.

3. A course indicator for aircraft including a yieldingly centralized rate of turn gyroscope, a multi-cylinder reversible engine, and a single reversing and throttle valve for said engine connected to and moved by said gyroscope as it precesses, comprising a three port stationary member having its central port connected to a pressure source, one outer port to one end of said engine and the other port to the other end, and a cooperating valve member secured to turn with said gyroscope when it precesses and having a throttling recess to connect the source to either outer port, whereby in its central position both outer ports are closed, and upon movement in one direction pressure fluid is supplied from said pressure source to a respective one of said outer ports at a rate proportional to the extent of such movement, and the other port is open, and vice versa.

4. A directional indicator for aircraft showing the direction and amount of deviation from course, comprising a constrained gyroscope mounted for precession through an angle proportional to the rate of turn of the craft, a hydraulic engine having a control or reversing throttle valve connected to and operated by said gyroscope, so constructed and arranged as to cause said engine to be driven in a direction and at a rate proportional to the direction and extent of precession of said gyroscope, and a thermostatically controlled relief valve in the pressure fluid supply to said engine for compensating for changes in fluid viscosity due to temperature changes.

5. A directional indicator for aircraft showing the direction and amount of deviation from course, comprising a constrained gyroscope mounted for precession through an angle proportional to the rate of turn of the craft, a hydraulic engine having a reversing control valve connected to said gyroscope, so constructed and arranged as to cause said engine to be driven in a direction and at a rate proportional to the direction and extent of precession of said gyroscope, a compass card indicator actuated from said engine showing the course by its position, and a thermostatically controlled by-pass valve in the pressure fluid supply to said engine for compensating for changes in fluid viscosity due to temperature changes.

6. In a course indicator for aircraft, a gyroscope of the turn indicator type, spring means for normally centralizing the same, a pick-off valve on said gyroscope, an engine controlled by said valve, a course change indicator driven by said engine, and electromagnetic means controllable from a remote point for shifting the centralized position of the gyroscope to bring the indicator to rest for the purpose specified.

7. In a course indicator for aircraft, a gyroscope of the turn indicator type, spring means for normally centralizing the same, a pick-off valve on said gyroscope, an engine controlled by said valve, a course change indicator driven by said engine, and means for resetting said indicator including electromagnetic means adjacent said gyroscope for exerting a torque about its precession axis, and means for varying at will the torque exerted thereby.

8. A rotary cylindrical course change indicator for aircraft comprising a cylindrical cylinder block having markings thereon and containing an odd number of cylinder bores, each cylinder having a pair of axially spaced ports, a hollow stationary shaft on which said block is mounted and having axially spaced oppositely opening ports therein and each connected with a different group of cylinder ports, a source of fluid pressure, and a rate of turn device for directing the flow of said pressure fluid to either one or the other of said shaft ports, dependent upon the direction of turn.

9. In a course indicator for aircraft, an outer casing, a gyroscope of the turn indicator type enclosed in said casing and normally immersed in liquid therein, spring means for normally centralizing the same, a pick-off valve turned by said gyroscope, a reversible engine controlled by said valve, a course change indicator driven by said engine, and means for resetting said indicator including a pair of opposed electromagnets adjacent said gyroscope for exerting a variable torque about its precession axis in either direction, and manual means without said casing for varying at will the relative strength of said electromagnets to alter centralized position of the gyroscope.

10. A course indicator for dirigible craft as claimed in claim 3, wherein the throttling recess in said valve member has tapering side walls curved in two planes.

THEODORE W. KENYON.